April 17, 1962     L. H. GRANT     3,029,859
POWER TOOLS FOR SHEET-METAL REPAIR WORK
Filed Nov. 5, 1958     2 Sheets-Sheet 1
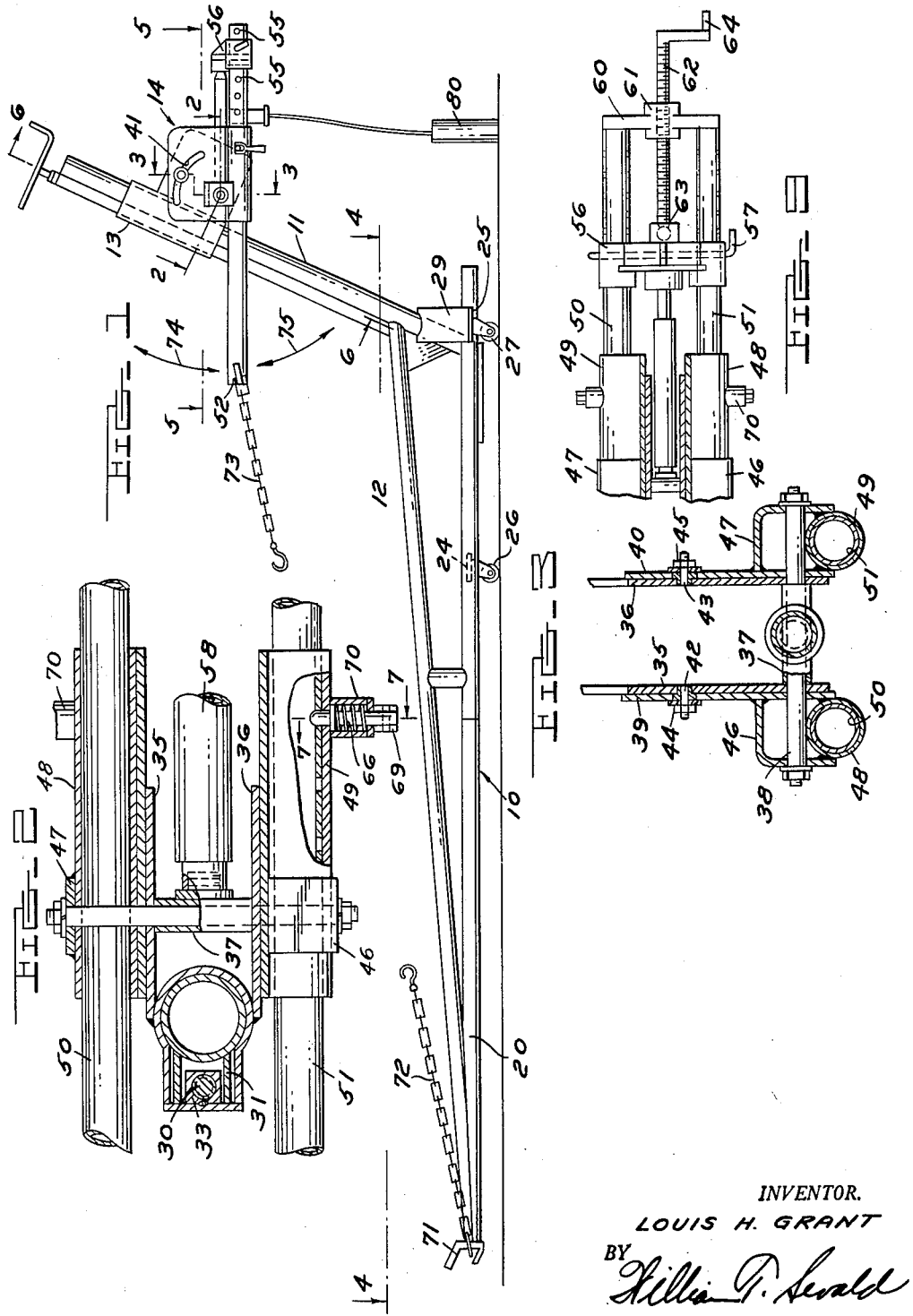
INVENTOR.
LOUIS H. GRANT
BY
ATTORNEY

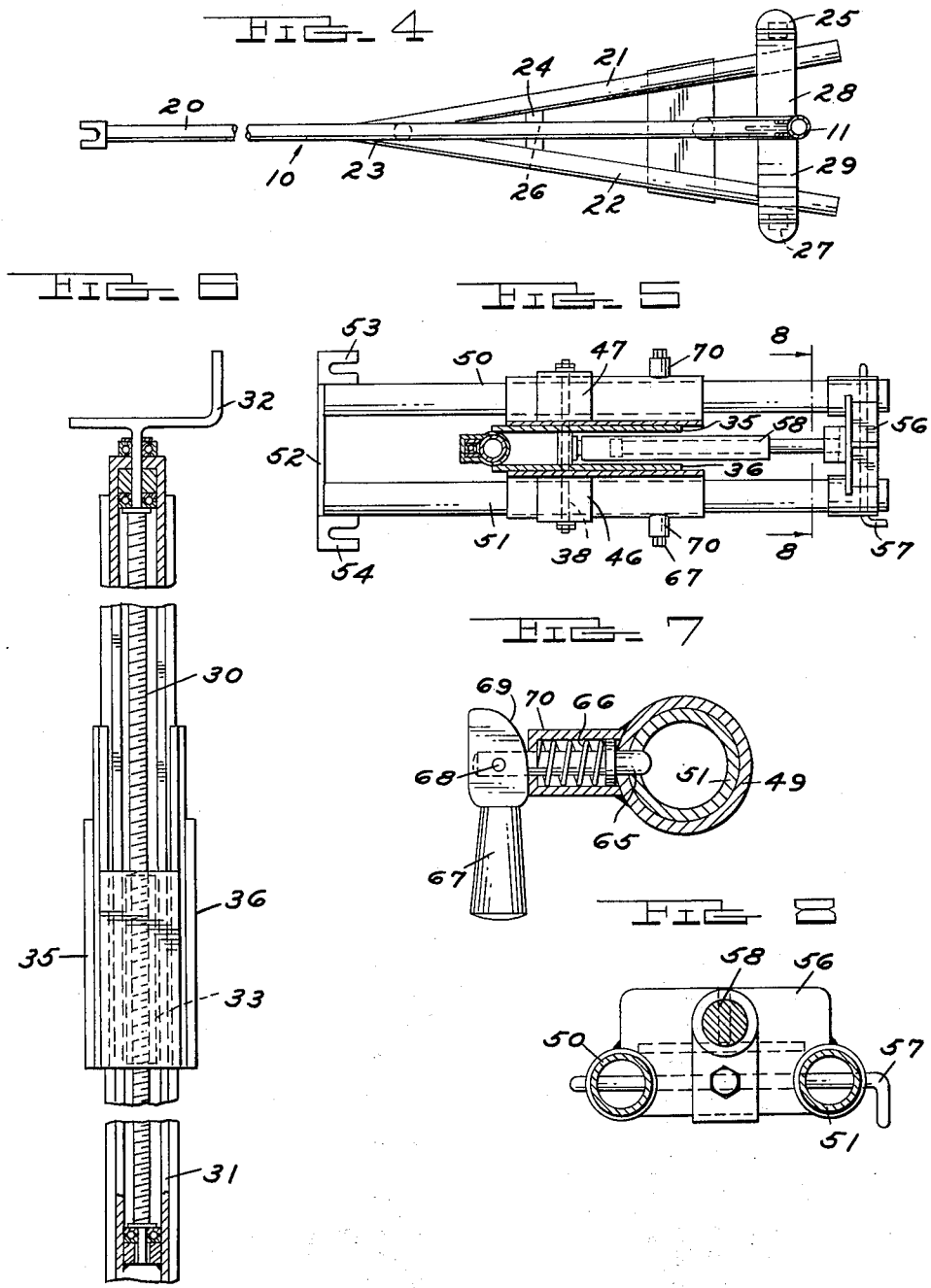

United States Patent Office 3,029,859
Patented Apr. 17, 1962

3,029,859
POWER TOOLS FOR SHEET-METAL REPAIR WORK
Louis H. Grant, 19908 Parkville Ave., Livonia, Mich.
Filed Nov. 5, 1958, Ser. No. 772,121
4 Claims. (Cl. 153—32)

This invention relates to power tools and in particular pertains to a tool for automobile body sheet-metal repair work capable of pushing or pulling damaged parts into proper form and location.

Power tools for sheet-metal repair work have been employed heretofore to facilitate the forming and moving of sheet-metal parts which have been deformed and dislocated, however, the several devices of the prior art have not proved entirely satisfactory inasmuch as they are complicated in design and construction, expensive to manufacture, difficult to use, and do not embody the adjustability nor the means to direct forces at desired compound angles.

With the foregoing in view, the primary object of the invention is to provide a power tool for automobile body repair work which is simple in design and construction, inexpensive to manufacture, easy to use, and which embodies suitable adjusting means for directing forces at the necessary compound angles to move damaged sheet-metal parts in any direction as desired to re-locate them in the desired proper form and position.

An object of the invention is to provide a Y-shaped base frame area with a stem portion for projecting under an automobile body and a forked end portion for supporting the mast thereon.

An object of the invention is to provide a triangulating brace between the frame and the mast to support the mast against endwise exerted forces.

An object of the invention is to provide a slide on the mast and a jackscrew in conjunction therewith for raising and lowering the mast slide.

An object of the invention is to provide a pivotally mounted hanger on the mast slide so that the force members on the hanger can be moved to any desired angular plane.

An object of the invention is to provide slide tubes on the hanger and a rear cross head on the slide tubes which is adjustable relative thereto for extending or retracting the slide tubes relative to the car body and also relative to the full stroke of the hydraulic cylinder furnishing the power for moving the slide tubes.

An object of the invention is to provide a hydraulic cylinder between the rear cross head and the mast for bi-directionally moving the slide tubes.

An object of the invention is to provide an axially spaced aperture in the slide tubes and an aperture aligned therewith on the rear cross head for receiving an interconnecting thrust pin therein in any adjusted axial position.

An object of the invention is to provide latch means for fixing the slide tubes while attaching and adjusting the device to a vehicle body.

An object of the invention is to provide an initial adjusting means including an adjusting nut located on a rear block across the slide members and an adjusting bolt located in the nut for moving the rear cross head axially relative to the slide tubes for creating an initial tension or compression between the device and a vehicle and also for properly aligning the thrust pin holes of the slide tubes and cross head so as to be capable of taking advantage of the full stroke of the hydraulic cylinder.

These and other objects of the invention will become apparent by reference to the following description of a power tool suitable for automobile body sheet-metal work embodying the invention taken in connection with the accompanying drawing in which:

FIG. 1 is a side elevational view of the device.

FIG. 2 is an enlarged cross-sectional view of FIG. 1 taken on the line 2—2 thereof.

FIG. 3 is an enlarged cross sectional view of FIG. 1 taken on the line 3—3 thereof.

FIG. 4 is a reduced cross-sectional view of FIG. 1 taken on the line 4—4 thereof, slightly reduced, showing the base frame in top plan view.

FIG. 5 is an enlarged cross sectional view of FIG. 1 taken on the line 5—5 thereof.

FIG. 6 is an enlarged cross sectional view of FIG. 1 taken on the line 6—6 thereof.

FIG. 7 is an enlarged cross sectional view of FIG. 2 taken on the line 7—7 thereof, showing the alternate latch means.

FIG. 8 is an enlarged cross sectional view of FIG. 5 taken on the line 8—8 thereof; and FIG. 9 is a view similar to FIG. 5 showing the preferred cross-head adjusting means for producing the initial tension and compression in the device and for aligning the thrust pin holes of the cross-head and slide tubes.

Referring now to the drawings wherein like numerals refer to like and corresponding parts throughout the several views, the power tool disclosed therein to illustrate the invention comprises a Y-shaped base frame 10, a mast 11 supported thereon, a triangulating brace 12 disposed between the stem end of the frame 10 and the mast 11 supporting the mast against endwise exerted forces, a slide 13 mounted on the mast 11, and a power mechanism 14 disposed on the mast for exerting forces in substantially any direction relative to sheet-metal parts being repaired.

More particularly the Y-frame 10 includes a stem 20 and forked arms 21 and 22 emanating from the throat 23, a front cross piece 24 disposed between the arms 21 and 22 adjacent the throat 23 and a rear cross piece 25 disposed between the arms 21 and 22 adjacent their rear ends. A caster wheel 26 is located beneath the front cross piece 24 and paired caster wheels 27 are located below the rear cross piece 25 so as to provide a triangulated rotatable support for the frame 10 and paired struts 28 and 29 are triangularly disposed between the ends of the rear cross piece 25 and the mast 11 supporting the mast against the sidewise exerted forces.

To raise and lower the slide 13 relative to the mast 11, a jack screw 30 is provided inclosed in a housing 31 lying parallel to the mast 11 and equipped with a crank 32 and the slide 13 is provided with a jack nut 33 engaging the screw 30 so that upon turning the crank 32 the jack screw 30 and nut 33 raise and lower the slide 13 on the mast 11; the slide 13 is equipped with paired support plates 35 and 36 extending rearwardly therefrom between which is disposed the thrust sleeve 37 for receiving the pivot pin 38 therethrough and it is to be noted that the plates 35 and 36 are provided with suitable pin receiving apertures aligned with the thrust sleeve 37. Hanger plates 39 and 40 overlie the support plates 35 and 36 and are provided with suitable apertures for receiving the pin 38 so that the hanger plates 39 and 40 pivot about the pin 38 and the hanger plates are provided with paired arcuate slots 41 for receiving the lock bolts 42 and 43 embedded in the support plates 39 and 40 respectively so that by tightening the nuts 44 and 45 respectively, the adjusted angular position of the hanger plates 39 and 40 relative to the support plates 35 and 36 is secured and locked.

The hanger plates 39 and 40 are provided with braces 46 and 47, L-shaped in cross section, and the paired tubular slides 48 and 49 are welded to the hanger plates 39 and 40 and also to the braces 46 and 47 to securely mount the tubular slides 48 and 49 on the hanger plates 39 and 40.

Paired slide tubes 50 and 51 are slidably disposed in the tubular slides 48 and 49 respectively and the front cross-bar 52 is disposed across the front ends of the slide tubes 50 and 51 and is equipped with chain engaging grapples 53 and 54 at either side thereof for connection to sheet-metal clamps for pulling sheet-metal or to various shaped tools for pushing sheet-metal as desired.

The rear ends of the slide tubes 50 and 51 have paired longitudinally spaced thrust pin receiving apertures 55 and the rear cross head 56 is movably disposed on the slide tubes 50 and 51 for relative axial adjusting movement and the cross head 56 is also equipped with apertures for receiving the thrust pin when the apertures of the cross head 56 are aligned with a pair of apertures 55 in the slide tubes 50 and 51 whereupon the thrust pin 57 is inserted between the slide tubes 50 and 51 and the cross head 56 to fix the rear cross head 56 to the slide tubes 50 and 51. The selectively bi-directional movable hydraulic cylinder 58 is disposed between the rear cross head 56 and the thrust sleeve 37, and as is well understood in the art of hydraulic cylinders, the cylinder 58 is capable of exerting force moving the cross head 56 and slide tubes 50 and 51 rearwardly-outwardly to provide a pulling force or upon reversing the application of power to the cylinder 58, the hydraulic cylinder 58 is capable of moving the cross head 56 and slide tubes 50 and 51 forwardly-inwardly to provide a pushing force.

Referring to FIG. 9, a block 60 is disposed across the rear ends of the slide tubes 50 and 51 and an adjusting nut 61 is fixed on the block 60 and coacts with the adjusting bolt 62 which is rotatably disposed therein with the bolt 62 end rotatably journaled and fixed to the rear cross head 56, and it is obvious that by turning the crank 64 that the rotation of the bolt 62 will move the rear cross head axially relative to the slide tubes 50 and 51 to any adjusted position when the thrust pin 57 is removed; upon the cross head 56 being properly located as desired relative to the slide tubes 50 and 51, the thrust pin 57 can be reinserted locking the rear cross head 56 on the slide tubes 50 and 51 for operating the hydraulic cylinder 58 thereagainst to move the slide tubes 50 and 51 in either direction as desired depending upon the application of power to the cylinder 58. A manually operated catch, FIGS. 2 and 7, is also provided having a spring pressed pin 65 normally moved inwardly by the spring 66 to engage the slide tubes 50 and 51 to hold them in any axially adjusted position. It is to be noted, that by movement of the handle 67 pivotally mounted on the pin 65 of the pivot 68, that the cam portion 69 engaging the housing 70 can move the pin 65 outwardly so as to release the slide tube 51 for sliding movement relative to the tubular slide 49. The adjusting bolt and nut disclosed in FIG. 9 and the latch disclosed in FIG. 7 are used to hold the slide tubes in any axial position while tools and chains are being attached to the vehicle and the sheet-metal preparatory to operating the tool.

Referring now to the operation of the device and first describing same in conjunction with pulling forces exerted on the sheet-metal portion of an automobile body, the foot 71 on the stem 20 is butted against an automobile frame for furnishing the reaction point to the pulling forces whereupon suitable sheet-metal clamps are secured, not shown, to the chain 73 attached to the front cross bar 52 chain engaging elements 53 and 54 and the operator then operates the crank 32 on the jack screw 30 to raise or lower the mast slide 13 on the mast 11 to locate the front cross bar 52 at the desired height. To exert the forces at the desired angular direction on the sheet-metal, the operator then loosens the lock nuts 44 and 45 releasing the hanger plates 39 and 40 for pivotal movement about the pivot pin 37 so that the forces exerted by the movement by the slide tubes 50 and 51 is at the proper desired angle and it is to be noted that the arrows 74 and 75 indicate that the cross bar 52 end of the supply tubes can be pivotally moved from the position shown in FIG. 1 as desired. Upon the operator locating the slide 13 at the proper height and the angle of the slide tubes 50 and 51 by pivoting the hanger plates, he then tightens the lock nuts 44 and 45 securing the device as adjusted. He then moves the handle 67 to withdraw the pin 65 and then moves the slide tubes 50 and 51 rearwardly and also manually moves the rear cross head 56 forwardly or to the left as seen in the drawing so as to move the piston and cylinder to its base position to obtain the maximum travel in the hydraulic cylinder operation whereupon he aligns the apertures of the rear cross head 56 and the slide tubes 50 and 51 and inserts the thrust pin 57 whereupon the device is ready for full stroke operation. The hydraulic power supply 80 causes the hydraulic cylinder 58 to thrust against the rear cross head 56 and move it rearwardly or to the right as seen in FIG. 1 thereby moving the slide tubes 50 and 51 to the right tensioning the chain to pull the sheet-metal parts attached thereto. Upon the parts being moved the desired distance or to the desired location the operator cuts the power from the supply 80 and detaches the chains and re-locates the device as desired for the next movement or operation or application of force via the tool.

Referring now to the operation of the device in conjunction with a pushing motion relative to sheet-metal parts the chain 72 is engaged in the opposite direction as shown in FIG. 1 or a chain not shown, is looped around the mast 11 and attached to the vehicle to provide suitable re-action anchoring whereupon the operator turns the crank 32 to operate the jack-screw to elevate or lower the mast slide 13 as desired and he also loosens the block nuts 44 and 45 so as to be capable of pivoting the hanger plates 39 and 40 to swing the slide tubes 50 and 51 to the desired position to exert the desired angle of force against the sheet-metal of the vehicle being repaired. Upon lock tightening the lock nuts 44 and 45 securing the device in the desired angular position, he then moves the slide tubes 50 and 51 forwardly or to the left as seen in the drawing until they engage the sheet-metal and he then moves the rear cross head 56 rearwardly or to the right as seen in FIG. 1 as far as possible as to extend the hydraulic cylinder as far as possible to obtain the maximum stroke. With the modification of FIG. 9, this can be accomplished by turning the crank 64 to operate the adjusting bolt 62 and upon the slides and cross head being moved to the desired position and the aperture 55 in the slide tubes 50 and 51 being aligned with the apertures of the rear cross head 56, the operator inserts the thrust pin 57 and the device is ready for operation with the power supply 80 feeding the opposite end of the cylinder so as to cause the cylinder to pull the rear cross head 56 inwardly or to the left as seen in FIG. 1 so as to move the cross bar 52 inwardly or to the left as seen in the drawing to apply a pushing force against the vehicle sheet-metal being repaired.

Due to the fact that there is considerable initial or preliminary tensioning or compressing movement of the sheet-metal in operating the device, the modification shown in FIG. 9 is considered very important due to the fact that the device, chains, and sheet-metal can be initially tensioned or compressed by the operation of the adjusting screw 62 to move the cross head either forwardly or rearwardly so that upon the cross head being fixed with the thrust pin 57, the full stroke and power of the hydraulic cylinder can be used to actually move and form the sheet-metal. The device of FIG. 9 is highly useful in conjunction with the initial set-up and location of the device relative to a vehicle body being repaired to secure the device in the most advantageous position while attachment is being made to the vehicle.

The inventive power tool with these features constitutes a compact, durable, neat appearing, and highly efficient and useful and adaptable tool easily operated to push or pull sheet metal in repairing a vehicle body.

Although but a single embodiment of the invention has been shown and described in detail, it is obvious that many changes may be made in the size, shape, detail, and arrangement of the various elements of the invention within the scope of the appended claims.

I claim:

1. A tool particularly suitable for automobile body sheet-metal repair work capable of pushing or pulling damaged parts into proper form and location comprising a frame, a mast having a lower end fixed on said frame, a jack mounted parallel to said mast, a sleeve slidably disposed on said mast for movement up and down thereon, means on said sleeve engaging said jack; said jack being adapted to raise and lower said sleeve in any adjusted vertical position on said mast; paired support plates extending from said mast sleeve having paired pivot-pin receiving apertures and paired lock bolt receiving apertures, paired hanger plates partially overlying said support plates having paired pivot pin apertures aligned with said support plate pivot pin apertures and paired arcuate slots aligned with said support plate lock bolt apertures, a pivot pin and lock bolts in said respective apertures, paired tubular slides on said hanger plates, paired slide tubes in said tubular slides having front and rear ends, a front cross-bar between said slide tubes at the front ends thereof for engaging a work piece, a rear cross-head axially slidably disposed on said slide tubes at the rear ends thereof for engaging one end of a hydraulic cylinder; said tubes and rear cross-head having aligned apertures; a cooperating pin disposed in the cooperating apertures of said rear cross-head and said tubes preventing relative movement therebetween, an anchor sleeve around said pivot pin between said support plates, a hydraulic cylinder disposed between said rear cross-head and said anchor sleeve; said cylinder being adapted to move said cross-head selectively rearwardly or forwardly; and means for connecting said cross bar to a vehicle sheet-metal portion to be pulled or pushed; said mast slide and jack locating said slide tubes at the desired height; said hanger plates pivoted mounting locating the angular disposition of said slide tubes as desired; said height and angle adjustments in conjunction with said hydraulic cylinder pushing and pulling providing the necessary universally adjustable force application to move sheet-metal in any direction.

2. A tool particularly suitable for automobile body sheet-metal repair work capable of pushing or pulling damaged parts into proper form and location comprising a base frame, a mast having a lower end fixed on said frame, first slide means slidably disposed on said mast for movement up and down thereon, means to lock, raise and lower said first slide means in any adjusted vertical position on said mast; a pivotal mounting means on said mast first slide means, at least one second slide on said mounting means, a sliding member on said second slide means having a front and rear end, a bar at said sliding member front end for engaging a work piece, a rear head axially slidably disposed on said sliding member at the rear end thereof for engaging one end of a hydraulic cylinder, an anchor on said mast first slide means, hydraulic cylinder disposed between said rear head and said anchor; said cylinder being adapted to move said rear head selectively rearwardly or forwardly; and means for connecting said one thrust pin receiving paired aperture; said sliding member having a thrust pin receiving aperture aligned with said rear head aperture, a thrust pin disposed in said rear head aperture and in the aperture of said sliding member; and means for connecting said bar to a vehicle sheet metal portion to be pulled or pushed; said mast slide raising and lowering means and pivotal mounting means locating said sliding members at the desired height and angular disposition providing the necessary universal force application to move sheet-metal in any direction.

3. A tool particularly suitable for automobile body sheet-metal repair work capable of pushing or pulling damaged parts into proper form and location comprising a base frame, a mast having a lower end fixed on said frame, first slide means slidably disposed on said mast for movement up and down thereon, means to lock, raise and lower said first slide means in any adjusted vertical position on said mast; a pivotal mounting means on said mast first slide means, at least one second slide pivotally connected on said mounting means, a sliding member on said second slide means having a front and a rear end, a bar at said sliding member front end, a head slidably disposed on said sliding member adjacent its end for engaging one end of a hydraulic cylinder, an anchor on said mast first slide means, a hydraulic cylinder disposed between said rear head and said anchor; said cylinder being adapted to move said head selectively rearwardly or forwardly; means for locking said head on said sliding member at an adjusted axial location; said sliding member being axially adjustable relative to said head to locate said front bar as desired relative to said mast and to a workpiece via said locking means; a block on said sliding member rear end, and adjusting means located between said head and said block to move said sliding member relative to said head to tension or press said device in taut condition and to align said locking means in the adjusted position with said hydraulic cylinder located at the beginning of its stroke in either direction, means for connecting said device to a vehicle portion, and means for connecting said cross bar to a vehicle sheet-metal portion to be pulled or pushed.

4. A tool particularly suitable for automobile body sheet metal repair work capable of pushing or pulling damaged parts into proper form and location comprising a Y-shaped base frame lying in a horizontal plane having an extending stem at one end adapted to project beneath a vehicle and forked arms at the other end extending from a throat at the point of junction with said stem, a cross-piece between said arms, a mast having a lower end fixed on said cross-piece, a rotatable substantially vertical jack screw and crank mounted parallel to said mast, a sleeve slidably disposed on said mast for movement up and down thereon, a non-rotatable jack nut on said mast sleeve engaging said jack screw; said jack screw and nut being adapted to raise, lower, and hold said sleeve in any adjusted vertical position on said mast; paired support plates extending from said sleeve, paired hanger plates adjustably pivotally mounted on said support plates, lock means on said plates for securing said plates in adjusted pivotal position, power slide means on said hanger plates, said power slide means being locatable at any compound angle relative to work piece by positioning the device such as by adjusting said frame position, by adjusting said support plates' height via said jack, and by adjusting the angle of said hanger plates via their pivotal mounting on said support plates; said power slide means comprising paired tubular slides having front and rear ends, a hydraulic cylinder lying parallel between said tubes, a front cross-bar between said slide tubes at the front ends thereof for engaging a work piece, a rear cross-head axially slidably disposed on said slide tubes at the rear ends thereof for engaging one end of said hydraulic cylinder, said rear cross-head having a thrust pin aperture; a thrust pin connecting said rear cross-head and said tubes; an anchor sleeve between said support plates; said hydraulic cylinder being disposed between said rear cross-head and said anchor sleeve; said cylinder being adapted to move said cross-head selectively rearwardly or forwardly; and means for connecting said frame to a vehicle portion.

References Cited in the file of this patent
UNITED STATES PATENTS

| | | |
|---|---|---|
| 1,611,738 | Guilford | Dec. 21, 1926 |
| 2,442,425 | Merrill et al. | June 1, 1948 |
| 2,757,705 | Johnson | Aug. 7, 1956 |
| 2,799,920 | Hansen | July 23, 1957 |
| 2,836,220 | Johnson | May 27, 1958 |